United States Patent [19]
Arai

[11] Patent Number: 4,916,365
[45] Date of Patent: Apr. 10, 1990

[54] COLOR CRT DISPLAYING CORRECTION CIRCUIT

[75] Inventor: Chiharu Arai, Tokyo, Japan

[73] Assignee: Anritsu Corporation, Tokyo, Japan

[21] Appl. No.: 237,908

[22] Filed: Aug. 29, 1988

[30] Foreign Application Priority Data

| Aug. 31, 1987 | [JP] | Japan | 62-215420 |
| Aug. 31, 1987 | [JP] | Japan | 62-215421 |
| Mar. 4, 1988 | [JP] | Japan | 63-49796 |
| Mar. 7, 1988 | [JP] | Japan | 63-51556 |

[51] Int. Cl.$^4$ .................... H01J 29/52; H01J 29/58
[52] U.S. Cl. .................... 315/383; 315/382; 315/386
[58] Field of Search ............ 315/382, 383, 386, 403, 315/370

[56] References Cited

U.S. PATENT DOCUMENTS 4,319,163  3/1982  Chen .................... 315/368 X

FOREIGN PATENT DOCUMENTS 50-56810  5/1975  Japan .

Primary Examiner—Thomas H. Tarcza
Assistant Examiner—Gregory C. Issing
Attorney, Agent, or Firm—Frishauf, Holtz, Goodman & Woodward

[57] ABSTRACT

A color CRT includes a screen to effect display by being illuminated by electron beams and at least one grid for controlling a character of the display on the screen. A horizontal deflection coil is provided on the color CRT for horizontal deflection of the electron beams. A vertical deflection coil is provided on the color CRT for vertical deflection of the electron beams. A horizontal deflection circuit supplies a horizontal deflection current to the horizontal deflection coil. A vertical deflection circuit supplies a vertical deflection current to the vertical deflection coil. A horizontal parabolic waveform voltage generator generates a horizontal parabolic waveform voltage with the level thereof increasing for positions from the center to the edges of the screen according to the horizontal deflection current in synchronism to the horizontal deflection. A vertical parabolic waveform voltage generator generates a vertical parabolic waveform voltage with the level thereof increasing for positions from the center to the edges of the screen according to the horizontal deflection current in synchronism to the vertical deflection. A grid modulator supplies the horizontal and vertical parabolic waveform voltages in superimposition on a bias voltage to the grid.

11 Claims, 12 Drawing Sheets

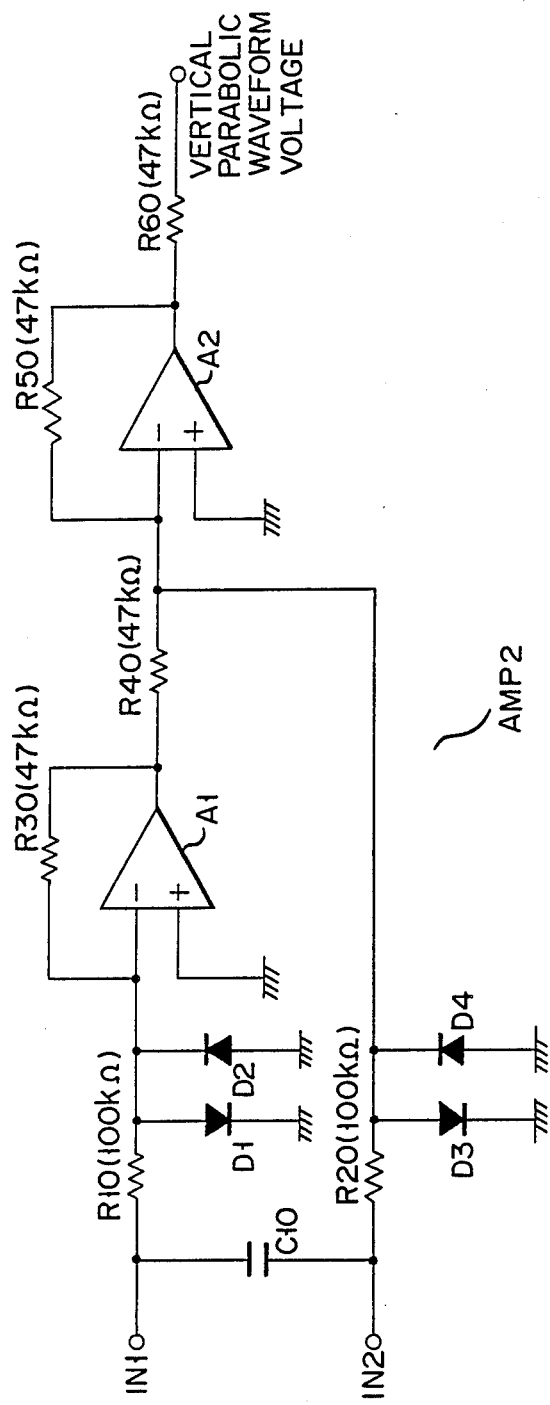
F I G. 5

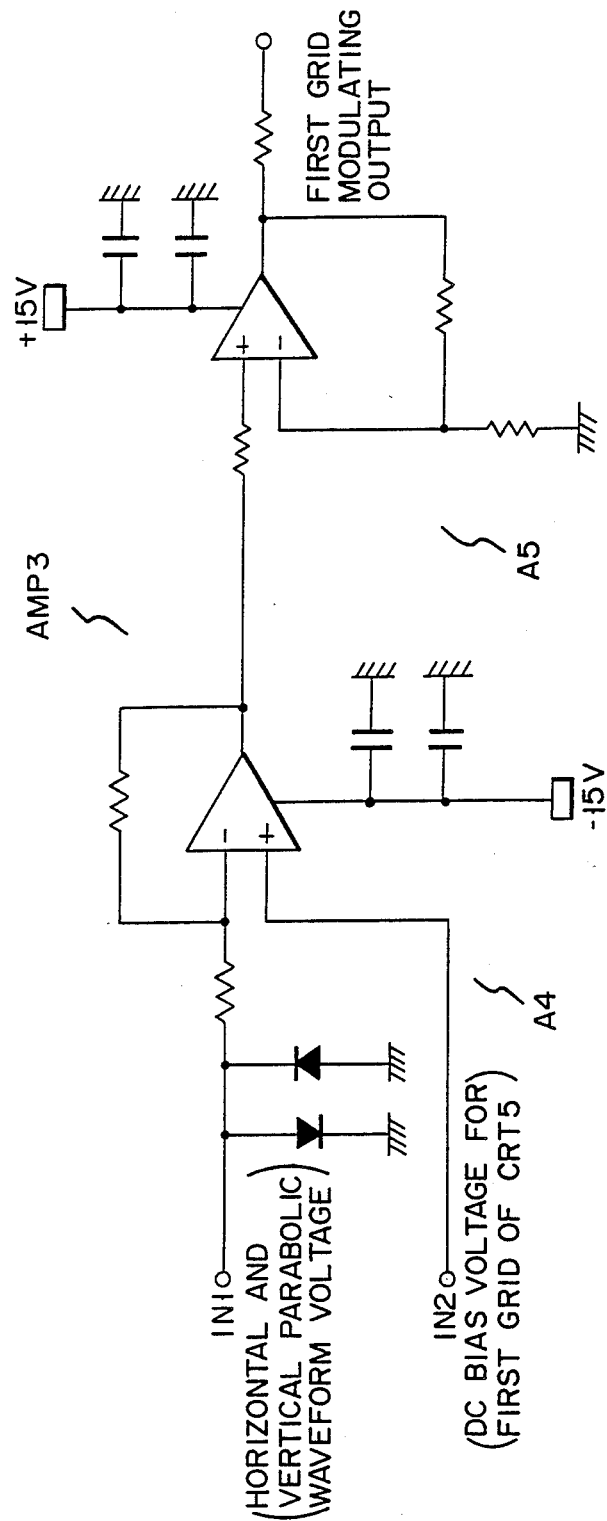
F I G. 6

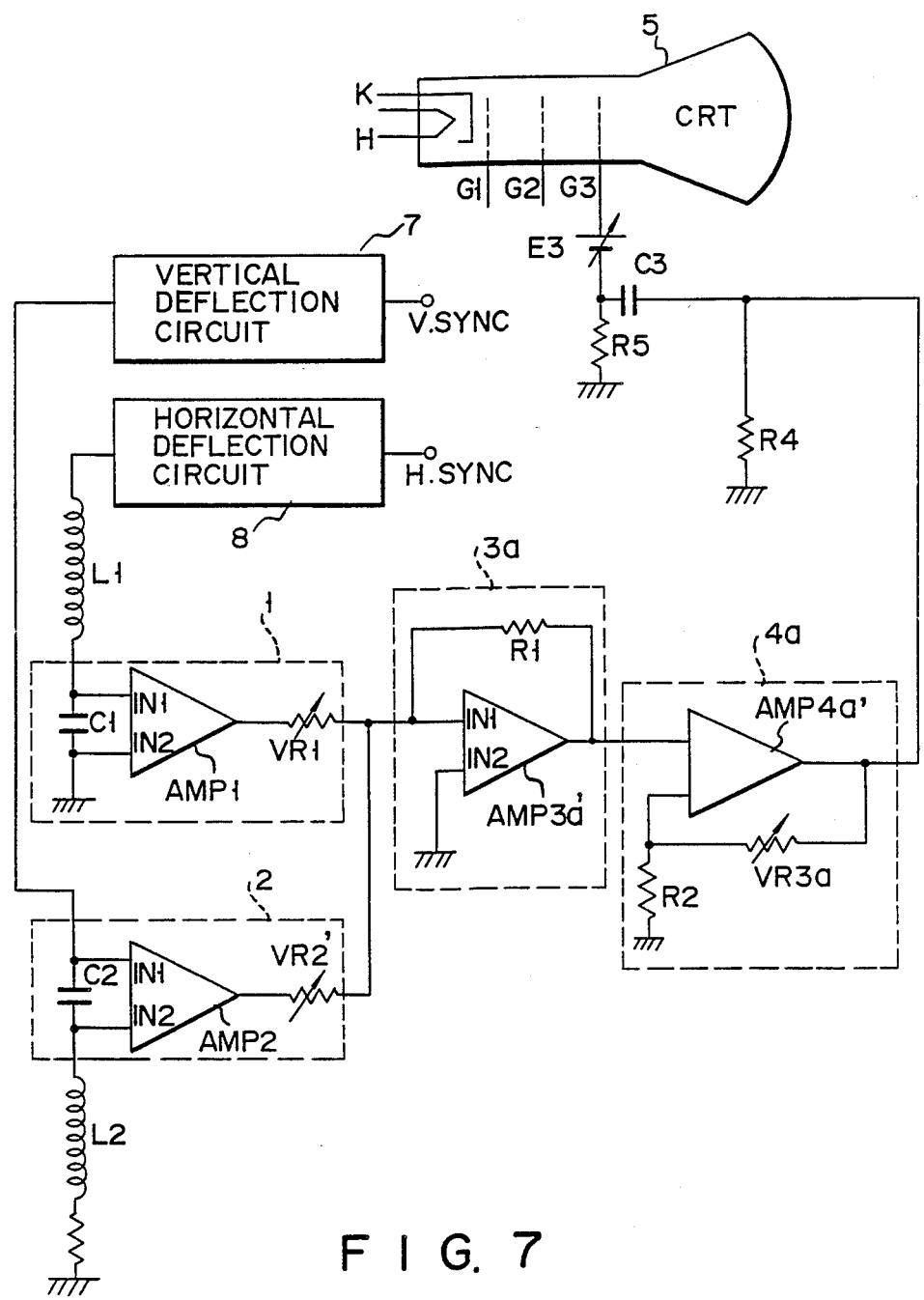
F I G. 7

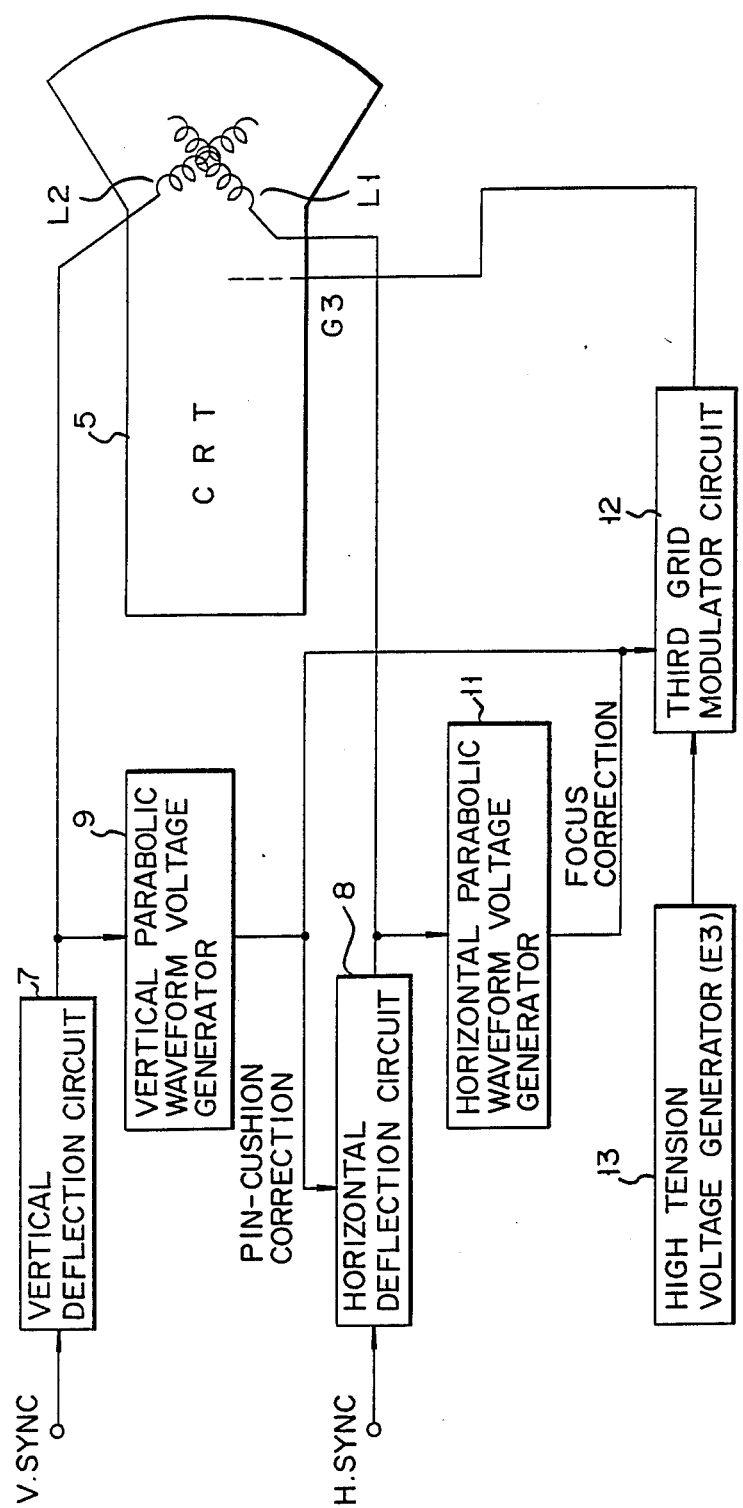
F I G. 10

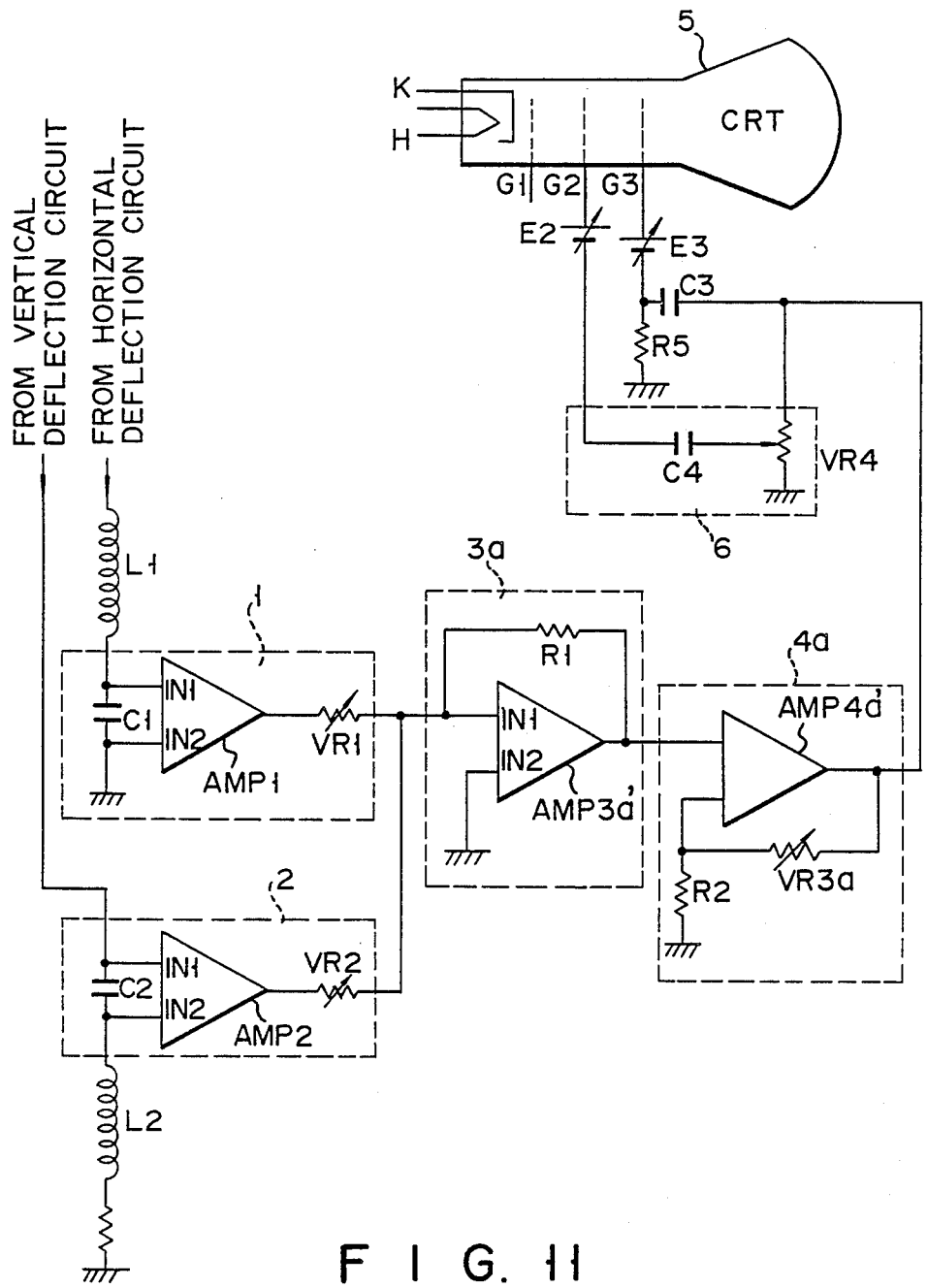
F I G. 11

COLOR CRT DISPLAYING CORRECTION CIRCUIT

BACKGROUND OF THE INVENTION

1. Field of the Invention

This invention relates to a color CRT (cathode-ray tube) displaying correction circuit and, more particularly, to a circuit for correcting CRT display brightness and image quality irregularities.

Further, the invention concerns, in a CRT having a relatively high resolution and required to provide satisfactory image quality such as a computer terminals, a CRT brightness irregularity correction circuit for correcting the brightness to obtain substantially uniform brightness over the entire screen, i.e., a brightness without reduction in edge portions of the screen compared to a central portion thereof.

Still further, the invention concerns, in a CRT as noted above, a CRT image quality correction circuit using a parabolic waveform voltage generation circuit for obtaining a substantially uniform image quality.

Yet further, the invention concerns, in a CRT as noted above, a CRT image quality irregularity correction circuit, which can correct reduced brightness, deteriorated focusing and increased electron beam spot diameter in edge portions of the screen compared to a central portion thereof, thus obtaining a substantially uniform image quality over the entire screen.

2. Description of the Related Prior Art

Presently used CRTs, either color or monochromatic, adopt an electron gun structure and ar called cathode modulation type. The brightness of the cathode modulation type CRT is substantially determined by the voltage applied between a cathode and a first grid. Therefore, for brightness control a video signal is applied to the cathode, and a DC voltage is applied to the first grid and usually varied.

Usually, the brightness is high in a central portion of the screen and low in edge portions thereof due to the CRT structure.

Recently, in computer terminal displays or the like cases of using multi-windows or the like are increasing with increase of the display dot number. If the CRT has brightness irregularities, the brightness is varied depending on the window display position, so that the screen can be seen very unsatisfactorily.

Japanese Patent Laid-Open Sho No. 50-110732, Utility Model Laid-Open Sho No. 61-16668 and Utility Model Laid-Open No. 62-89878 disclose techniques for solving the above problem. In these techniques, a correction circuit is provided for generating parabolic waveform signals by using integral circuits to integrate signals of deflection periods and superimposingly applying these parabolic waveform signals to the first grid of the CRT for increasing the brightness of the display on the screen as one goes toward the edges of the screen, thereby effecting the brightness irregularity correction over the entire screen.

In this prior art brightness irregularity correction circuit, the frequency of the parabolic waveform signals for the brightness irregularity correction is determined by the time constant of the circuit. Therefore, there is a first problem that if the circuit is used for a recently developed multi-scan type CRT which is capable of working frequency variation in a range of, for instance, 15.75 to 32 kHz and 48 to 64 kHz, it is necessary to set the time constant for every working frequency.

In addition, there is a second problem that since the signals are generated by the integral circuits, a time delay is produced to cause deviation from regular correspondence between the electron beam spot position on the screen and parabolic waveform voltage phase, so that satisfactory brightness irregularity correction can not be obtained.

The conventional correction circuits using the integral circuits for generating parabolic waveform signals, has a defect that a complicated adjustment is required corresponding to the changing of display contents, as shown in following table.

| contents of change | points to be adjusted |
|---|---|
| dimensions of CRT screen | amplitude of parabolic waveform signals |
| displaying position on CRT screen | amplitude and phase of parabolic waveform signals |
| CRT scanning frequency | amplitude and phase of parabolic waveform signals, and time content of integral circuit |

The cathode-modulation type electron gun of the CRT is known by various names depending on its structure. Basically, however, in the cathode modulation type anode current Ib in the CRT, i.e., the brightness on the screen, is varied depending on the voltage difference applied between first grid G1 and cathode K.

Likewise, the electron beam spot diameter on the phosphor screen and anode current Ib are varied depending on the voltage difference applied between first and second grids G1 and G2, and the focusing is varied depending on the voltage difference applied between first and third grids G1 and G3.

Presently, TV grade monitors are used with suitable DC bias voltages applied to first to third grids G1 to G3. Further, in monitors having comparatively high resolution, focusing errors at edge portions of the screen are avoided with a system called dynamic focusing, in which horizontal and/or vertical parabolic waveform voltages are applied to only third grid G3 for focusing control.

FIG. 1 is a schematic showing a prior art CRT dynamic focusing circuit for avoiding image quality irregularities.

Referring to the Figure, there are shown horizontal and vertical parabolic waveform voltage generators 1a and 2a, adding circuit 3a, amplifier circuit 4a, CRT 5, differential amplifier AMP3a', to which horizontal and vertical parabolic waveform voltages are supplied, feedback resistor R1 in the adding circuit for differential amplifier AMP3a', amplifier AMP4a' for amplifying the output of differential amplifier AMP3a' to a level of a drive voltage for third grid G3 of CRT 5, feedback resistor R2 for determining the gain of amplifier AMP4a' and variable resistor VR3a for controlling a parabolic waveform voltage necessary for third grid G3 of CRT 5. Coupling capacitor C3 is provided for coupling only the AC component of the horizontal and vertical parabolic waveform voltages as output signal of amplifier AMP4a' to third grid G3 of CRT 5 for compensation of focusing. There are further shown DC bias power supply E3 for third grid G3, output stabilization load resistor R4 for amplifier AMP4a' and bias resistor R5. Reference symbols G1, G2, K and H in the Figure designate first and second grids, a cathode and a heater of CRT 5.

Prior art CRT 5 has a relatively round and convex faceplate as shown by the solid line in FIG. 1. Recently, however, FS tubes, which have relatively flat and square faceplates as shown by the dashed line in FIG. 1, are being used extensively for better appearance of the screen. With a FS tube, the distance from the electron gun assembly to the phosphor screen varies greatly between the central and edge portions of the screen. Therefore, although a DC voltage application system (which is called static focusing in contrast to dynamic focusing) may be sufficiently be used for third grid G3 in the case of a FS tube CRT for household VT grading, with a computer terminal FS tube CRT having a high resolution compared to the TV grading it is necessary for obtaining a practically satisfactory display image quality to use a correction circuit for correcting focusing errors at edge portion of the screen, based on the dynamic focusing (in which a parabolic waveform voltage is superimposedly applied to only third grid G3).

Particularly, a computer terminal display or the like frequently uses multi-windows or the like when it is provided with an increased number of display dots. In this case, there is a peculiar problem that a window appearing on an edge portion of the screen has a less satisfactory appearance compared to a window appearing on the center of the screen due to image quality irregularities.

However, in the prior art displaying correction circuit the parabolic waveform signals for correcting the display quality irregularities has a fixed frequency determined by the time constant of the circuit. Therefore, a recently developed multi-scan type CRT which is capable of working frequency variation in a range of, for instance, 15.75 to 32 kHz or 48 to 64 kHz, has a fourth problem that it is necessary to set the time constant depending on the working frequency and a fifth problem stemming from the generation of signal with an integrating circuit that a regular correspondence between the beam position on the screen and parabolic waveform voltage can not be obtained due to a time delay. Therefore, satisfactory display quality correction can not be obtained. Furthermore, conventional displaying correction circuit also has a defect that a complicated adjustment is required, as shown in the above described table.

In the CRT, aside from the display quality correction focusing correction based on the dynamic focusing as noted above, so-called pin-cushion correction also using parabolic waveform voltages has been in practice.

FIG. 2 shows a prior art circuit structure for effecting the focusing correction and pin-cushion correction as noted above. Vertical deflection circuit 7, to which a vertical sync signal (V. SYNC) provides a vertical deflection output to vertical deflection coil $V_L$ fitted on the outside of CRT 5. Horizontal deflection circuit 8, to which a horizontal sync signal (H. SYNC) is supplied, provides a horizontal deflection output to a horizontal deflection coil $H_L$ also fitted on the outside of CRT 5. For the pin-cushion correction, first vertical parabolic waveform voltage generator 9 provides a first vertical parabolic waveform voltage according to the vertical deflection output for superimposition on a voltage in a predetermined part of horizontal deflection circuit 8. For the focusing correction, second vertical parabolic waveform voltage generator 10 generates a second vertical parabolic waveform voltage according to a vertical deflection component led out from a predetermined part of vertical deflection circuit 7. Further, horizontal parabolic waveform voltage generator 11 generates a horizontal parabolic waveform voltage according to the horizontal sync signal (H. SYNC). The second vertical parabolic waveform voltage and horizontal parabolic waveform voltage are superimposed on each other, and the resultant voltage is supplied to third grid (G3) modulator circuit 12 for superimposition on a high tension voltage component from high tension voltage generator 13 to produce a third grid modulation output which is supplied to third grid G3 of CRT 5.

The above circuit construction, however, requires two independent vertical parabolic waveform voltage generators 9 and 10, which is undesirable not only structurally but also economically. These problems are also encountered in case of CRT brightness irregularity correction by superimposing a DC bias voltage and a parabolic waveform voltage on each other, and applying the resulting signal to the first grid of the CRT.

SUMMARY OF THE INVENTION

It is, therefore, an object of the invention to provide a new and improved color CRT displaying correction circuit, which can effect CRT displaying correction easily and satisfactorily.

Another object of the invention is to solve the first and second problems noted before by the provision of a CRT brightness irregularity correction circuit, which can be used for the multi-scan CRT as noted above and is free from deviation from regular correspondence between the beam position on the screen and parabolic waveform voltage phase, and can decrease adjustment points.

A further object of the invention is to solve the third to fifth problems noted before by the provision of a CRT display image quality correction circuit, which can be used for the multi-scan system CRT and uses a parabolic waveform generation circuit for precluding deviation from the regular correspondence between the beam position on the screen and parabolic waveform voltage phase.

A still further object of the invention is to solve the third problem noted before by the provision of a CRT display image quality irregulating correction circuit, which can correct CRT display image irregularities to obtain a substantially uniform display image quality over the entire screen.

According to one aspect of the invention, there is provided a color CRT displaying correction circuit comprising:

a color cathode-ray tube including a screen to effect display by being illuminated by electron beams and at least one grid for controlling a character of the display on the screen;

a horizontal deflection coil provided on at a predetermined position thereof said color cathode-ray tube for horizontal deflection of said electron beams;

a vertical deflection coil provided on said color cathode-ray tube at a predetermined position thereof for vertical deflection of said electron beams;

a bias voltage source for supplying bias voltages to grids of said color cathode-ray tube;

horizontal deflection circuit means for supplying a horizontal deflection current to said horizontal deflection coil;

vertical deflection circuit means for supplying a vertical deflection current to said vertical deflection coil;

horizontal parabolic waveform voltage generator means for generating a horizontal parabolic waveform voltage with the level thereof increasing for positions from the center to the edge of the screen of said color cathode-ray tube according to said horizontal deflection current supplied from said horizontal deflection circuit means to said horizontal deflection coil and in synchronism to said horizontal deflection;

vertical parabolic waveform voltage generator means for generating a vertical parabolic waveform voltage with the level thereof increasing for positions from the center to the edge of the screen of said color cathode-ray tube according to said horizontal deflection current supplied from said vertical deflection circuit means to said vertical deflection coil and in synchronism to said vertical deflection; and grid modulation means for supplying said horizontal parabolic waveform voltage generated by said horizontal parabolic waveform generator means and said vertical parabolic waveform voltage generated by said vertical parabolic waveform voltage generator means in superimposition on said bias voltage from said bias voltage source to a grid of said color cathode-ray tube.

BRIEF DESCRIPTION OF THE DRAWINGS

Those and other objects and features of the present invention can be understood through the following embodiments by reference to the accompanying drawings, in which:

FIGS. 4 to 6 are circuit diagrams showing respective examples of a differential amplifier shown in FIG. 3;

FIG. 7 is a schematic showing a second embodiment of the invention applied to a CRT display image quality correction circuit;

FIG. 10 is a schematic showing a CRT peripheral circuit according to the invention;

FIG. 11 is a schematic showing a third embodiment of the invention; and

DETAILED DESCRIPTION OF THE PREFERRED EMBODIMENTS

Now, some preferred embodiments of the invention will be described with reference to the drawings.

First, a CRT brightness irregularity correction circuit which is adopted according to the invention will be summarized.

Figure 2:
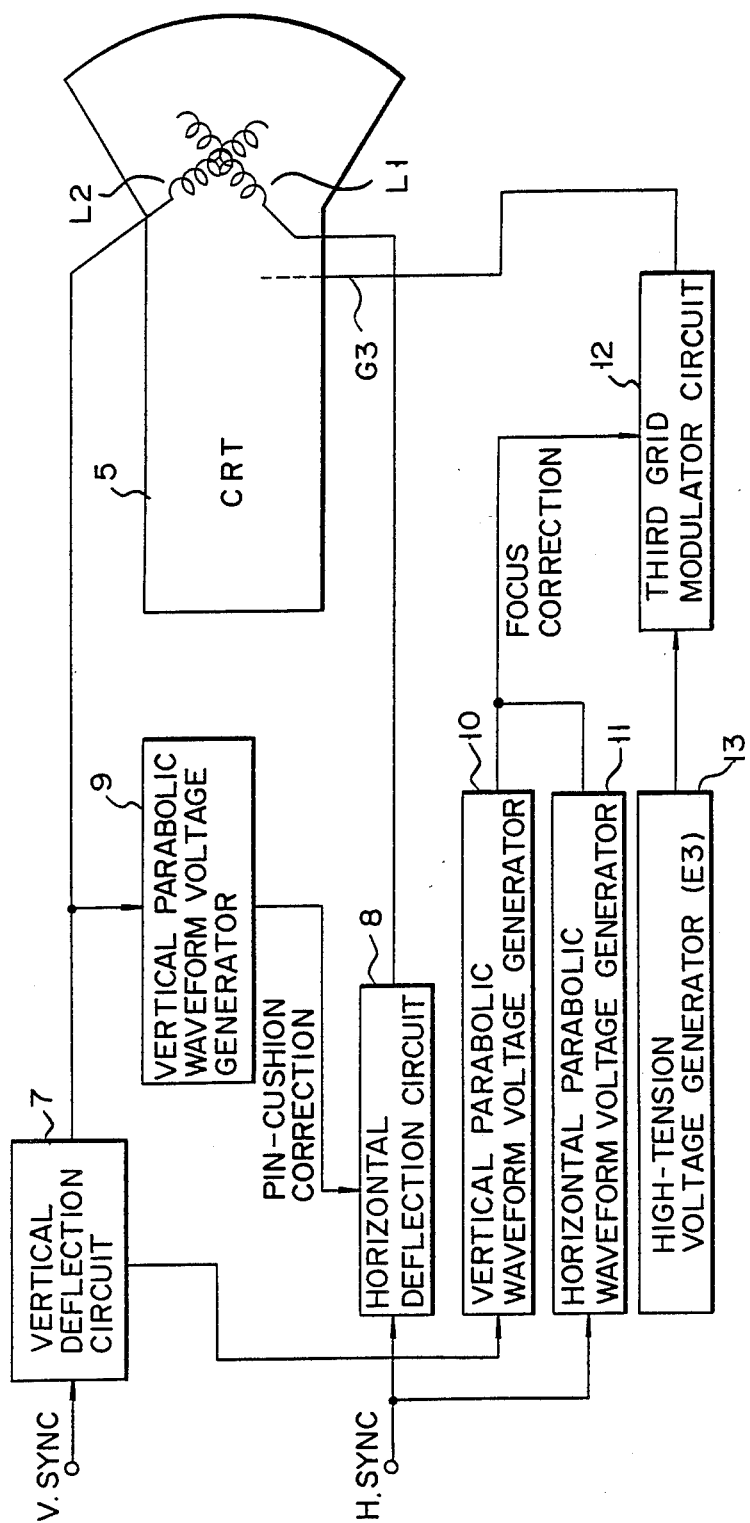
FIG. 2 is a schematic showing a prior art CRT peripheral circuit.

In many usual monochromatic CRTs the pin-cushion distortion is corrected in a deflection yoke portion with a magnet or the like. In color CRTs, left and right pin-cushion distortions are corrected at driving circuits of horizontal and vertical deflection coils. That is say, in color CRT, color deviations are generated by miss-landing and miss-convergence of electronic beams, and inferior of color purities. This end is usually attained by a system, in which a parabolic waveform voltage is generated in synchronism to the vertical deflection and used to effect modulation of the horizontal deflection output as shown in FIG. 2.

According to the invention, a vertical parabolic waveform voltage is generated by using a vertical parabolic waveform voltage generation system for color CRT pin-cushion distortion correction, and a horizontal parabolic waveform voltage is generated by using a similar system. These two waveforms are added together by an analog adder, e.g., an operational amplifier, and a DC bias voltage provided with horizontal and vertical parabolic waveform modulations is applied to the first grid of the CRT to cause voltage variation for central and edge portions of the screen, thus effecting correction such as to increase the brightness of the peripheral screen portion.

Figure 3:
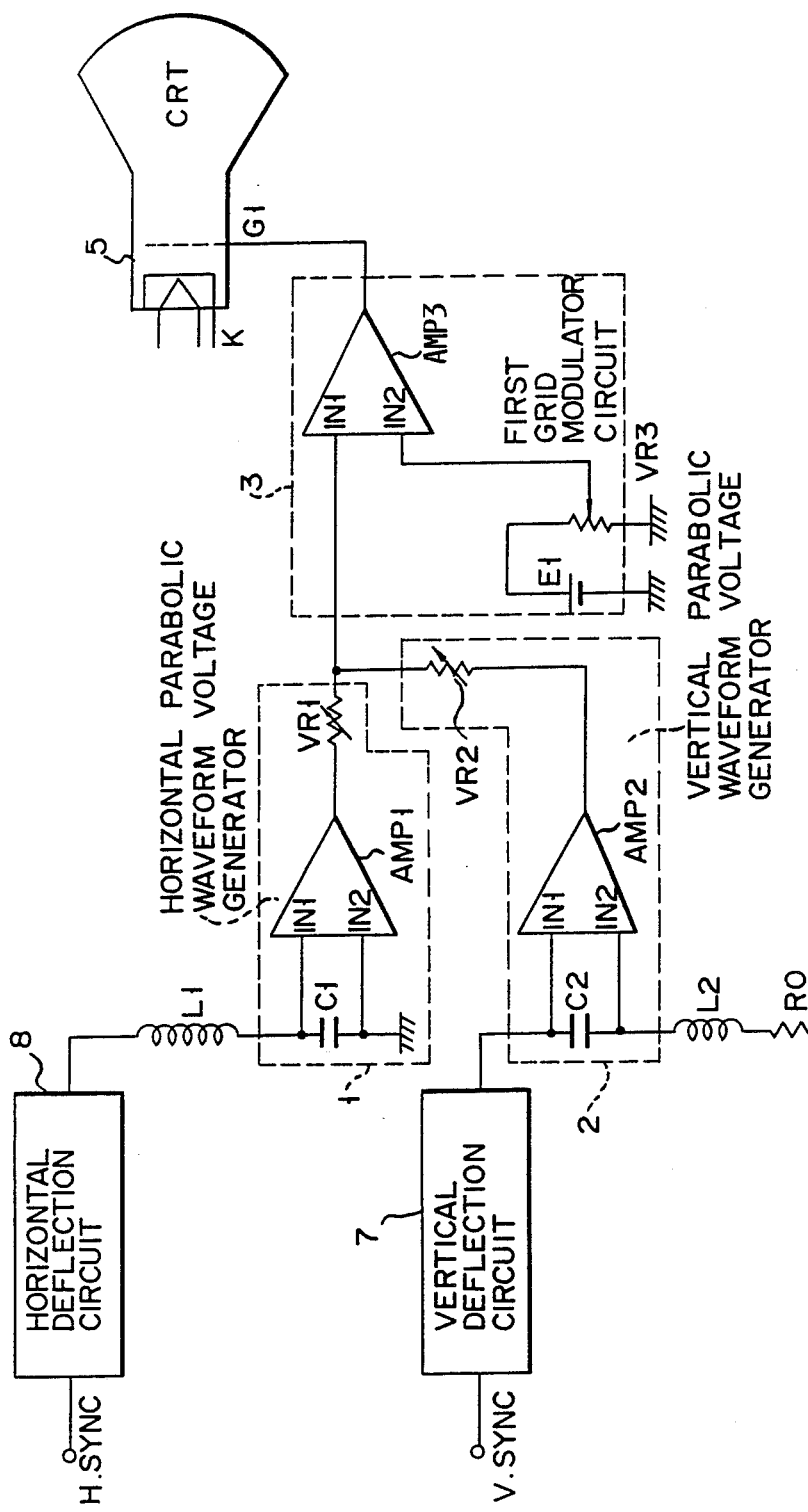
FIG. 3 is a schematic showing a first embodiment of the invention applied to a CRT brightness irregularity correction circuit.

FIG. 3 is a schematic showing an embodiment of the invention applied to a CRT brightness irregularity correction circuit which is based on the above-summarized contents.

Referring to the Figure, there are shown horizontal and vertical parabolic waveform voltage generators 1 and 2, first grid modulator circuit 3, CRT 5, horizontal and vertical deflection coils L1 and L2 fitted on the outside of CRT 5, S-shaped correcting capacitor C1 for horizontal linearity correction connected to the earth side of horizontal deflection coil H connected to the output terminal of horizontal deflection circuit 8, output capacitor C2 of vertical deflection circuit 7 connected between the output terminal of vertical deflection circuit 7 and one end of vertical deflection coil L2, resistor R0 for converting a deflection current supplied vertical deflection coil L2 into a voltage and for negative-feedbacking the voltage to vertical deflection circuit, differential amplifier AMP1 for picking up a parabolic waveform voltage appearing across S-shaped correction capacitor C1, differential amplifier AMP2 for picking up a parabolic waveform voltage appearing across output capacitor C2, variable resistor VR1 for controlling the extent of correction of brightness irregularities in the center and left and right directions of the screen, variable resistor VR2 for controlling the extent of correction of brightness irregularities in the center and upper and lower directions of the screen, differential amplifier AMP3 for superimposing adding components of the horizontal and vertical parabolic waveform voltages on a DC bias for modulation of first grid G1 of CRT 5, reference voltage source E1 for supplying a DC bias to first grid G1 and variable resistor VR3 for controlling the brightness of CRT 5.

Figure 4:
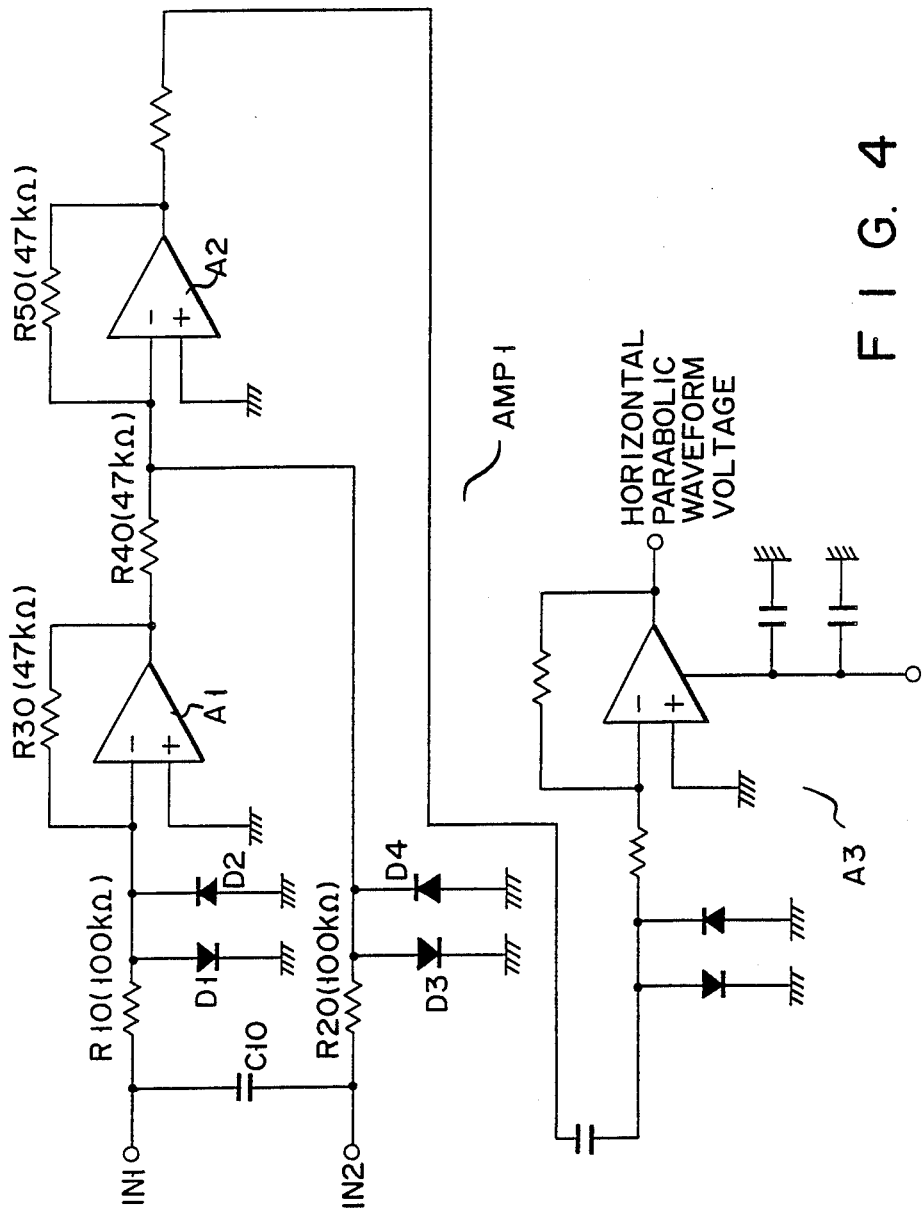

In this embodiment, differential amplifiers AMP1 and AMP2 have structures as shown in FIGS. 4 and 5. Differential amplifiers AMP1 and AMP2 should be suited for processing high voltages of several 100 volts and have a function of cancelling in-phase mode components in order to be able to extract only intended parabolic waveform components from complicated waveform components appearing in capacitors C1 and C2. More specifically, an input terminal of first inverting amplifier is made to be input terminal IN1, an input terminal of second inverting amplifier A2 connected to the output terminal of first inverting amplifier A1 is made to be other input terminal IN2, the ratio between the resistance of resistors R10, R20 and R20 to the resistance of resistors R30 and R50 are set to values as illustrated. With this arrangement, a voltage of 200 to 300 V which is applied between input terminals IN1 and IN2 coupled together by capacitor C10 is converted to 15 V and then inverted. In FIG. 4, designated at A3 is an AC component amplifier, and in FIGS. 4 and 5 designated at D1 to D4 are limiter diodes for an input protection of the amplifiers.

FIG. 6 shows differential amplifier AMP3. It has inverting and non-inverting amplifiers A4 and A5.

According to the invention, horizontal and vertical parabolic waveform generators 1 and 2 respectively generate parabolic waveform voltages, the level of which becomes higher for positions toward the edges of the screen, according to currents supplied to horizontal and vertical deflection coils L1 and L2 and in synchronism to the horizontal and vertical deflections. These voltages are added together and then supplied to first grid modulator circuit 3 to be superimposed on and modify the DC bias voltage supplied to first grid G1 of CRT 5 for the brightness irregularity correction. Therefore, even if the invention is applied to a multi-scan type CRT there is no need of setting a time constant according to the working frequency, and also it is possible to eliminate deviation from the regular correspondence between the beam position on the screen and parabolic waveform voltage phase, so that amplitude of the parabolic waveform voltages may be only adjusted.

As has been shown, the first embodiment of the invention comprises a horizontal parabolic waveform voltage generator for generating a parabolic waveform voltage with the level thereof increasing toward the edges of the screen according to the current supplied to the horizontal deflection coil and in synchronism to the horizontal deflection, a vertical parabolic waveform voltage generator for generating a parabolic waveform voltage with the level thereof increasing toward the edges of the screen according to the current supplied to the vertical deflection coil and in synchronism to the vertical deflection, and an adding circuit for adding together the horizontal and vertical parabolic waveform voltages from the horizontal and vertical parabolic waveform voltage generators and supplying the resultant voltage to the first grid of the CRT. Thus, if the circuit of the embodiment can be used even for a multi-scan system CRT without need of setting any time constant according to the working frequency, so that amplitude of the parabolic waveform voltages may be simply adjusted, and also the CRT brightness irregularities can be corrected without deviation from the regular correspondence between the beam position on the screen and parabolic waveform voltage phase, so that it is possible to obtain uniform brightness over the entire screen. Therefore, the invention circuit can decrease adjustment points. Particularly, pronounced effects can be obtained when the invention is applied to a FS tube CRT.

Now, a CRT display image quality irregularity correction circuit which is adopted according to the invention will be described.

FIG. 7 is a schematic showing a second embodiment of the invention applied to a CRT display image quality irregularity correction circuit.

Figure 1:
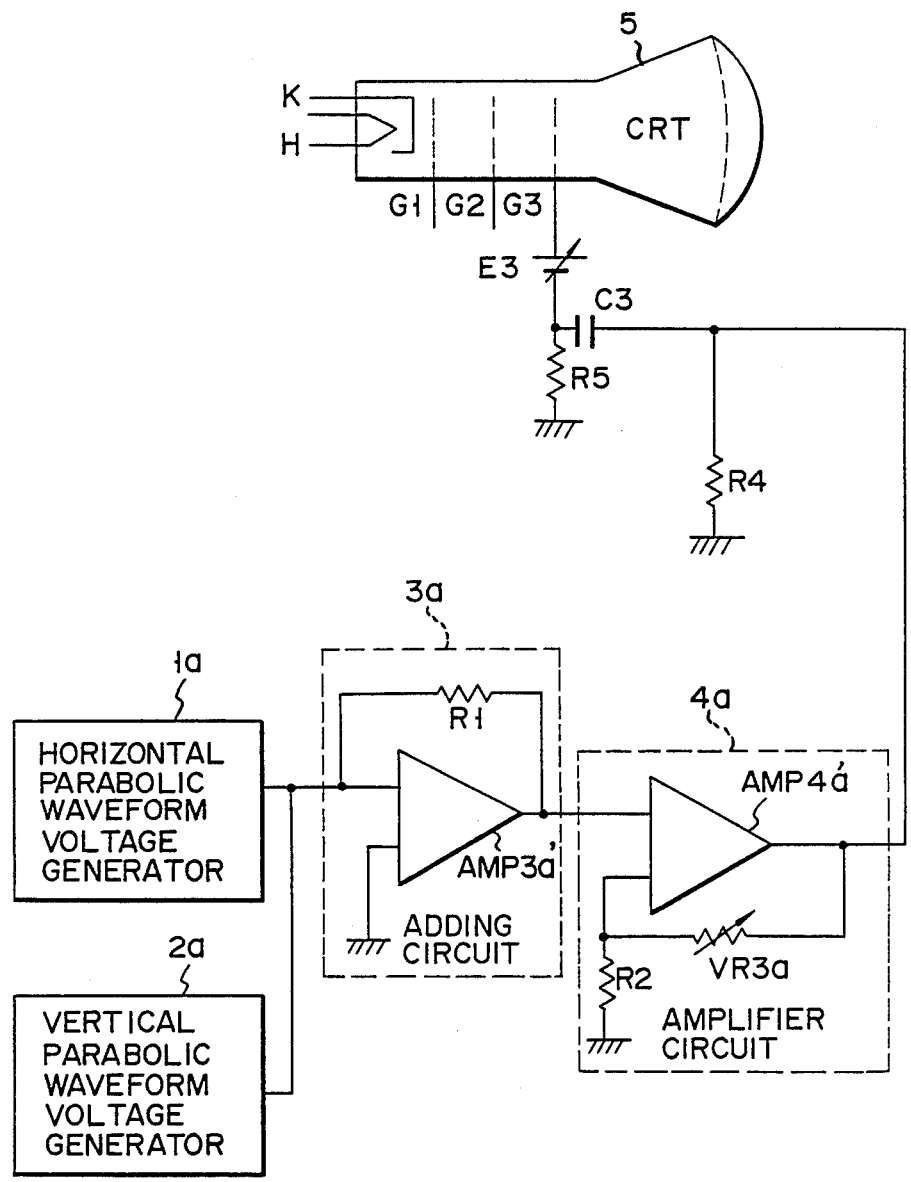
FIG. 1 is a schematic showing a prior art dynamic focusing circuit.

In the Figures, parts like those in FIGS. 1 and 3 are designated by like reference numerals and symbols, and their description is omitted. Referring to the Figure, there are shown horizontal and vertical parabolic waveform voltage generators 1 and 2 for generating horizontal and vertical parabolic waveform voltages, adding circuit 3a, amplifier 4a, horizontal and vertical deflection coils L1 and L2 fitted on the outside of CRT 5, S-shaped correction capacitor for horizontal linearity correction, vertical output capacitor C2, differential amplifier AMP1 for picking up a parabolic waveform voltage appearing across S-shaped correction capacitor C1, differential amplifier for picking up a parabolic waveform voltage appearing across output capacitor C2, variable resistor VR1' for controlling the extent of correction of image quality irregularities in the center and left and right directions of the screen, and variable resistor VR2' for controlling the extent of correction of image quality irregularities in the center and upper and lower directions of the screen.

In this embodiment, differential amplifiers AMP1 and AMP2 are the same as those shown in FIGS. 4 and 5.

Figure 8:
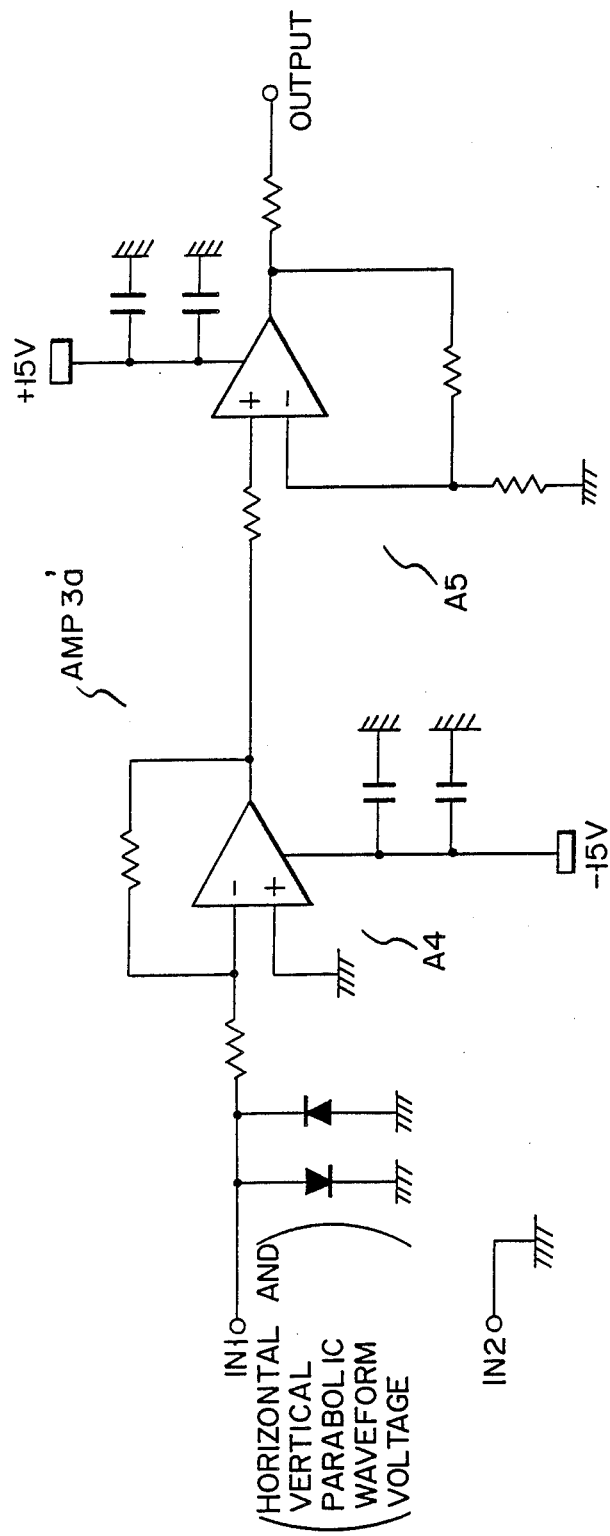
FIGS. 8 and 9 are circuit diagrams showing examples of an amplifier shown in FIG. 7.
Figure 9:
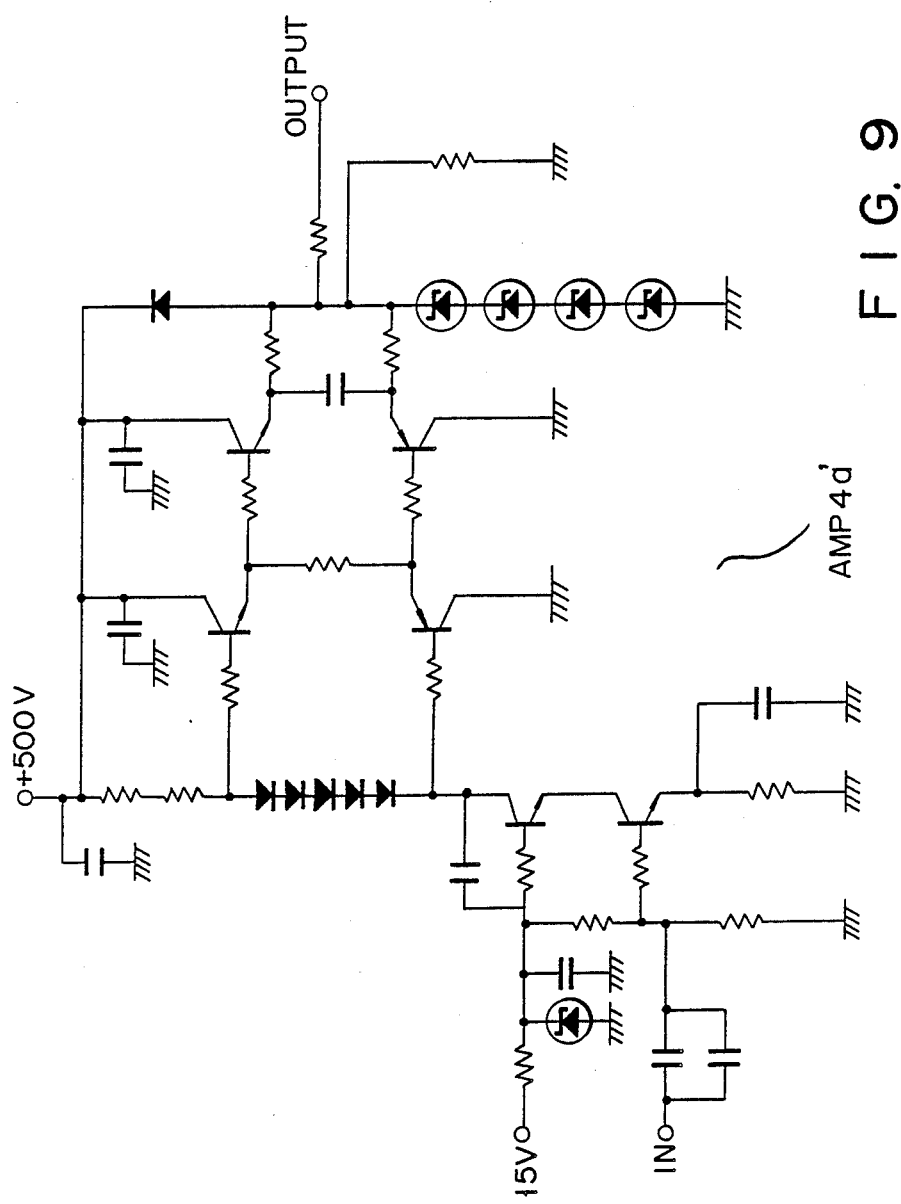

Differential amplifier AMP3a' and amplifier AMP4a' have structures as shown in FIGS. 8 and 9. Amplifier AMP3a' shown in FIG. 8 is similar to that shown in FIG. 6. Particularly, as amplifier AMP4a' shown in FIG. 9 a cascade connection type amplifier substantially free from mirror effect is used for speed increase and elimination of phase deviation.

In the usual color CRT, the left and right pin-cushion distortions are corrected circuit-wise. Generally, a parabolic waveform voltage is generated in synchronism to the vertical deflection and used for modulation of the horizontal deflection.

In the CRT image quality correction circuit according to the invention, the vertical parabolic waveform voltage is generated by vertical parabolic waveform voltage generator 2 by adopting a parabolic waveform generation system for color CRT pin-cushion correction, and the horizontal parabolic waveform voltage is also generated by horizontal parabolic waveform generator 1 also by adopting a similar system. These voltages are added together and then superimposed on DC bias voltage E3 supplied to third grid G3 of CRT 5.

Thus, when the circuit according to the invention is used for a multi-scan type CRT, the dynamic focusing can be realized without need of re-setting the time constant irrespective of working frequency changes.

Further, it is possible to use as the parabolic waveform voltage for pin-cushion distortion correction the output of differential amplifier AMP2 in vertical parabolic waveform voltage generator 2 for generating a voltage for focusing correction. Thus, it is possible to omit one of vertical parabolic waveform voltage generators 9 and 10, i.e., second vertical parabolic waveform voltage generator 10, in the circuit shown in FIG. 2, thus obtaining a simplified circuit as shown in FIG. 10. In FIG. 10 parts like those in FIG. 2 are designated by like reference numerals and symbols.

Further, the invention is of course applicable to recently announced four-electrode guns, i.e., so-called DBS or DAF electron guns, in which a negative lens is formed in the vertical direction and the third grid is divided in two, i.e., horizontal and vertical, directions for alleviating the vertical over-focusing.

FIG. 11 is a schematic showing a third embodiment of the invention applied to a CRT display image quality irregularity correction circuit.

In the Figure, parts like those in FIG. 7 are designated by like reference numerals and symbols. Referring to the Figure, there are shown driver circuit 6, variable resistor VR4, which is provided for stabilizing the output of amplifier AMP4a' and also serves to divide the output of amplifier AMP4a' to obtain a parabolic waveform voltage necessary for second grid G2, decoupling capacitor G4 for second grid G2 and DC bias voltage source E2 for second grid G2.

The DC bias voltage on second grid G2 is generally low compared to a 6,000-V to 8,000-V DC bias voltage on third grid G3 and is fixed at 500 to 800 V. According to the invention, the parabolic waveform voltage modulation component on third grid G3 is divided by variable resistor VR4 for application to second grid G2. In other words, a parabolic waveform voltage similar to that on third grid G3 is applied to second grid G2 as well.

Thus, the beam spot diameter is reduced from the center toward the edges of the screen, and it is possible to obtain a substantially uniform spot diameter over the entire screen by correction with a parabolic waveform voltage entirely in the same way as the dynamic focusing. Like the beam spot diameter, the brightness is also corrected such that it is increased in a parabolic form the center toward the edges of the screen.

However, since the brightness of the screen is predominantly affected by the voltage between first grid G1 and cathode K, the optimum values of the extents of correction of the beam spot diameter and brightness by the voltage on second grid G2 do not coincide at all time but are dependent on the electron gun structure and other factors. However, it is possible to effect the beam spot diameter and brightness at a time by applying a parabolic waveform voltage to second grid G2, and in this case a considerable effect can be obtained.

Generally, the increasing trend of the beam spot diameter toward the edges of the screen is attributable not only to the electron gun structure of the CRT but also to the deflection yoke. In this case, the shape of the beam spot is substantially not circular but is elliptically distorted in edge portions of the screen.

It has already been experimentally confirmed that by increasing the voltage on second grid G2 to reduce the beam spot diameter the resolution is visually improved to obtain image quality improvement as in the case of the round beam spot correction as according to the invention.

Further, according to the invention a parabolic waveform voltages are generated according to currents supplied to the horizontal and vertical deflection coils, so that it is possible to use the circuit according to the invention for a multi-scan type CRT, which is capable of working frequency changes, without need of altering the time constant of the circuit.

The second and third embodiments of the invention having the constructions described above have the following effects.

The parabolic waveform voltage generators used in the second and third embodiments generate parabolic waveform voltages with the level thereof increasing for positions toward the edges of the screen according to currents supplied to the horizontal and vertical deflection coils in synchronism to the horizontal and vertical deflections, respectively. Therefore, the embodiments may be used without need of setting a time constant according to the working frequency, and it is possible to obtain parabolic waveform voltages free from deviation from regular correspondence between the beam position on the screen and voltage phase.

In the second embodiment, since the parabolic waveform voltages with the level thereof increasing for positions forward the edges of the screen are supplied to the third grid in synchronism to the horizontal and vertical deflections, a dynamic focusing circuit can be realized, which is highly accurate and does not require any adjustment with respect to the working frequency.

In the third embodiment of the invention, in which the output of the dynamic focusing circuit is dividedly supplied to the second grid, it is possible to correct display image quality irregularities and obtain a substantially uniform image quality over the entire screen. Particularly, pronounced effects can be obtained with a FS tube CRT.

While the third embodiment has concerned with a case of supplying parabolic waveform voltages to the second and third grids and horizontal deflection coil, this use of the parabolic waveform voltage generation circuit is by no means limitative; for instance, it is possible to supply the voltages to first grid G1.

Figure 12:
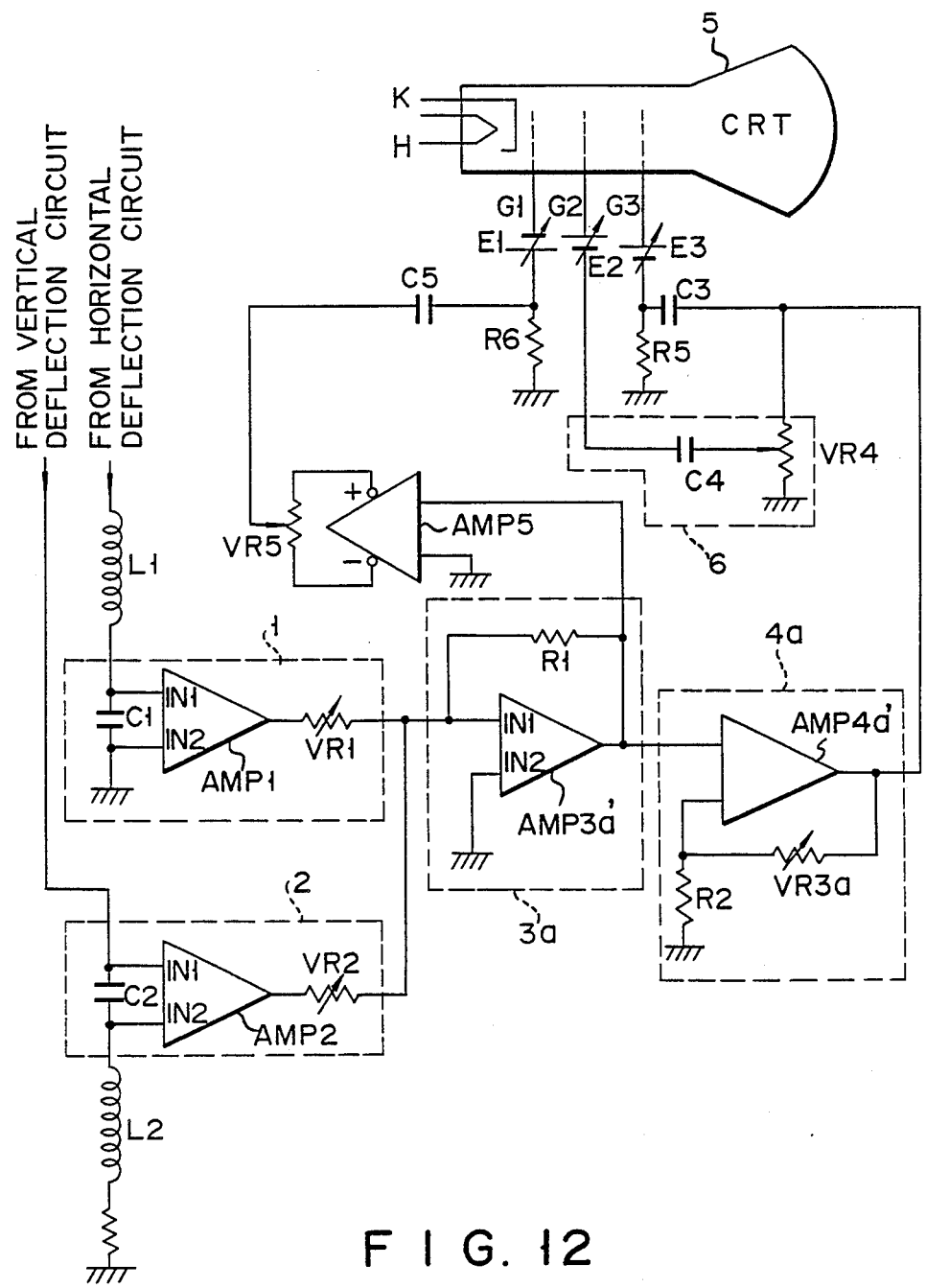
FIG. 12 is a schematic showing a fourth embodiment of the invention.

FIG. 12 shows a fourth embodiment of the invention applied to a case, in which the brightness irregularity correction and display image quality correction are both effected. In FIG. 12, parts like those in FIG. 11 are designated by like reference numerals and symbols, and their description is omitted. In this embodiment, the output of amplifier AMP3a' is coupled to amplifier AMP5, which supplies in-phase and opposite-phase component outputs (+) and (−) with respect to its input to the opposite terminals of variable resistor VR5. The output of variable resistor VR5 is coupled for superimposition through decoupling capacitor C5 to a bias circuit for first grid G1 of CRT 5. In the Figure, designated at E1 is a DC bias voltage source for first grid G1 and opposite in polarity to voltage sources E3 and E2, and at R6 a bias resistor for voltage source E1.

In the above construction, assuming that the output of amplifier 3a' has a downwardly convex parabolic waveform, the in-phase component output (+) of amplifier AMP5 has a downwardly convex parabolic waveform, and the opposite-phase component output (−) has an upwardly convex parabolic waveform. Thus, the output variable resistor VR5 is corrected such that the brightness is neither reduced nor increased at the center of the screen, increased in the edges of the screen with the output (+) and reduced in the edges of the screen with the output (−).

As has been shown, in this embodiment the brightness irregularities are corrected by supplying parabolic waveform voltages to first grid G1 of CRT 5. In the case of the previous third embodiment, prior to this correction the image quality irregularities are corrected (i.e., the beam spot diameter is made the same at the center and on the edges of the screen) by supplying parabolic waveform voltages to second grid G2 of CRT 5.

With the above construction of the fourth embodiment of the invention, in addition to obtaining the facts of the first to third embodiments, the construction can be simplified in that horizontal and vertical parabolic waveform voltage generators 1 and 2 and amplifiers AMP3a' and AMP3 of adding circuit 3a and first grid modulator circuit 3 are used for the brightness irregularity correction and display image irregularity correction. This effect can be augmented if the vertical parabolic waveform voltage generator is used for the pincushion correction as well.

What is claimed is:

1. A color CRT displaying correction circuit comprising:

a color cathode-ray tube including a screen to effect display by being illuminated by electron beams and at least one grid for controlling a character of the display on the screen;

a horizontal deflection coil provided on said color cathode-ray tube at a predetermined position thereof for horizontal deflection of said electron beams;

a vertical deflection coil provided on said color cathode-ray tube at a predetermined position thereof for vertical deflection of said electron beams;

a bias voltage source for supplying bias voltages to grids of said color cathode-ray tube;

horizontal deflection circuit means for supplying a horizontal deflection current to said horizontal deflection coil, and including an S-shaped capacitor for horizontal linearity correction on the screen of said color cathode-ray tube; vertical deflection circuit means for supplying a vertical deflection current to said vertical deflection coil;

horizontal parabolic waveform voltage generator means for generating a horizontal parabolic waveform voltage according to a voltage appearing across said S-shaped capacitor; with the level thereof increasing for positions from the center to the edges of the screen of said color cathode-ray tube according to said horizontal deflection current supplied from said horizontal deflection circuit means to said horizontal deflection coil and in synchronism to said horizontal deflection, and wherein said horizontal parabolic waveform voltage generator means includes differential amplifier means for converting a voltage appearing across said S-shaped capacitor to a low voltage and inverting said low voltage;

vertical parabolic waveform voltage generator means for generating a vertical parabolic waveform voltage with the level thereof increasing for positions from the center to the edges of the screen of said color cathode-ray tube according to said horizontal deflection current supplied from said vertical deflection circuit means to said vertical deflection coil and in synchronism to said vertical deflection; and grid modulation means for supplying said horizontal parabolic waveform voltage generated by said horizontal parabolic waveform generator means and said vertical parabolic waveform voltage generated by said vertical parabolic waveform voltage generator means in superimposition on said bias voltage from said bias voltage source to a grid of said color cathode-ray tube.

2. The circuit according to claim 1, wherein said bias voltage source includes means for varying the bias voltage.

3. A color CRT displaying correction circuit comprising:

a color cathode-ray tube including a screen to effect display by being illuminated by electron beams and at least one grid for controlling a character of the display on the screen;

a horizontal deflection coil provided on said color cathode-ray tube at a predetermined position thereof for horizontal deflection of said electron beams;

a vertical deflection coil provided on said color cathode-ray tube at a predetermined position thereof for vertical deflection of said electron beams;

a bias voltage source for supplying bias voltages to grids of said color cathode-ray tube;

horizontal deflection circuit means for supplying a horizontal deflection current to said horizontal deflection coil;

vertical deflection circuit means for supplying a vertical deflection current to said vertical deflection coil;

horizontal parabolic waveform voltage generator means for generating a horizontal parabolic waveform voltage with the level thereof increasing for positions from the center to the edges of the screen of said color cathode-ray tube according to said horizontal deflection current supplied from said horizontal deflection circuit means to said horizontal deflection coil and in synchronism to said horizontal deflection;

vertical parabolic waveform voltage generator means for generating a vertical parabolic waveform voltage with the level thereof increasing for positions from the center to the edges of the screen of said color cathode-ray tube according to said horizontal deflection current supplied from said vertical deflection circuit means to said vertical deflection coil and in synchronism to said vertical deflection;

grid modulation means for supplying said horizontal parabolic waveform voltage generated by said horizontal parabolic waveform generator means and said vertical parabolic waveform voltage generated by said vertical parabolic waveform voltage generator means in superimposition on said bias voltage from said bias voltage source to a grid of said color cathode-ray tube;

wherein said vertical deflection circuit means includes an output capacitor, and said vertical parabolic waveform voltage generator means generates said vertical parabolic waveform voltage according to a voltage appearing across said output capacitor; and wherein said vertical parabolic waveform voltage generator means includes differential amplifier means for converting a voltage appearing across said output capacitor to a low voltage and then inverting said low voltage.

4. The circuit according to claim 3, wherein said bias voltage source includes means for varying the bias voltage.

5. A color CRT displaying correction circuit comprising:

a color cathode-ray tube including a screen to effect display by being illuminated by electron beams and at least one grid for controlling a character of the display on the screen;

a horizontal deflection coil provided on said color cathode-ray tube at a predetermined position thereof for horizontal deflection of said electron beams;

a vertical deflection coil provided on said color cathode-ray tube at a predetermined position thereof for vertical deflection of said electron beams;

a bias voltage source for supplying bias voltage to grids of said color cathode-ray tube;

horizontal deflection circuit means for supplying a horizontal deflection current to said horizontal deflection coil;

vertical deflection circuit means for supplying a vertical deflection current to said vertical deflection coil;

horizontal parabolic waveform voltage generator means for generating a horizontal parabolic waveform voltage with the level thereof increasing for positions from the center to the edges of the screen of said color cathode-ray tube according to said horizontal deflection current supplied from said horizontal deflection circuit means to said horizontal deflection coil and in synchronism to said horizontal deflection;

vertical parabolic waveform voltage generator means for generating a vertical parabolic waveform voltage with the level thereof increasing for positions from the center to the edges of the screen of said color cathode-ray tube according to said horizontal deflection current supplied from said vertical deflection circuit means to said vertical deflection coil and in synchronism to said vertical deflection;

grid modulation means for supplying said horizontal parabolic waveform voltage generated by said horizontal parabolic waveform generator means and said vertical parabolic waveform voltage generated by said vertical parabolic waveform voltage generator means in superimposition on said bias voltage from said bias voltage source to a grid of said color cathode-ray tube;

wherein said grid modulation means includes means for adding together said horizontal parabolic waveform voltage from said horizontal parabolic waveform voltage generator means and said vertical parabolic waveform voltage from said vertical parabolic waveform voltage generator means; and wherein said grid modulation means includes differential amplifier means for superimposing the sum output of said adding means on a bias voltage from said bias voltage source.

6. The circuit according to claim 5, wherein said bias voltage source includes means for varying the bias voltage.

7. The circuit CRT displaying correction circuit comprising:

a color cathode-ray tube including a screen to effect display by being illuminated by electron beams and at least one grid for controlling a character of the display on the screen;

a horizontal deflection coil provided on said color cathode-ray tube at a predetermined position thereof for horizontal deflection of said electron beams;

a vertical deflection coil provided on said color cathode-ray tube at a predetermined position thereof for vertical deflection of said electron beams;

a bias voltage source for supplying bias voltages to grids of said color cathode-ray tube;

horizontal deflection circuit means for supplying a horizontal deflection current to said horizontal deflection coil;

vertical deflection circuit means for supplying a vertical deflection current to said vertical deflection coil;

horizontal parabolic waveform voltage generator means for generating a horizontal parabolic waveform voltage with the level thereof increasing for positions from the center to the edge of the screen of said color cathode-ray tube according to said horizontal deflection current supplied from said horizontal deflection circuit means to said horizontal deflection coil and in synchronism to said horizontal deflection;

vertical parabolic waveform voltage generator means for generating a vertical parabolic waveform voltage with the level thereof increasing for positions from the center to the edge of the screen of said color cathode-ray tube according to said horizontal deflection current supplied from said vertical deflection circuit means to said vertical deflection coil and in synchronism to said vertical deflection;

grid modulation means for supplying said horizontal parabolic waveform voltage generated by said horizontal parabolic waveform generator means and said vertical parabolic waveform voltage generated by said vertical parabolic waveform voltage generator means in superimposition on said bias voltage from said bias voltage source to a grid of said color cathode-ray tube;

first and second control means for independently correcting the brightness irregularities in the center, portions in the vertical directions and portions in the horizontal directions of the screen; and wherein said color cathode-ray tube includes at least a first grid for at least controlling the brightness of display on said screen, said bias voltage source supplies a bias voltage suited for said first grid, and said grid modulation means supplies an output obtained as a result of superimposition of said horizontal and vertical parabolic waveform voltages on said bias voltage to said first grid.

8. A color CRT displaying correction circuit comprising:

a color cathode-ray tube including a screen to effect display by being illuminated by electron beams and at least one grid for controlling a character of the display on the screen;

a horizontal deflection coil provided on said color cathode-ray tube at a predetermined position thereof for horizontal deflection of said electron beams;

a vertical deflection coil provided on said color cathode-ray tube at a predetermined position thereof for vertical deflection of said electron beams;

a bias voltage source for supplying bias voltages to grids of said color cathode-ray tube;

horizontal deflection circuit means for supplying a horizontal deflection current to said horizontal deflection coil;

vertical deflection circuit means for supplying a vertical deflection current to said vertical deflection coil;

horizontal parabolic waveform voltage generator means for generating a horizontal parabolic waveform voltage with the level thereof increasing for positions from the center to the edge of the screen of said color cathode-ray tube according to said horizontal deflection current supplied from said horizontal deflection circuit means to said horizontal deflection coil and in synchronism to said horizontal deflection;

vertical parabolic waveform voltage generator means for generating a vertical parabolic waveform voltage with the level thereof increasing for positions from the center to the edges of the screen of said color cathode-ray tube according to said horizontal deflection current supplied from said vertical deflection circuit means to said vertical deflection coil and in synchronism to said vertical deflection;

grid modulation means for supplying said horizontal parabolic waveform voltage generated by said horizontal parabolic waveform generator means and said vertical parabolic waveform voltage generated by said vertical parabolic waveform voltage generator means in superimposition on said bias voltage from said bias voltage source to a grid of said color cathode-ray tube.
wherein said color cathode-ray tube includes at least a third grid for at least controlling the electron beam focusing with respect to said screen, said bias voltage source supplies a bias voltage suited to said first grid, and said grid modulation means supplies an output obtained as a result of superimposition of said horizontal and vertical parabolic waveform voltages on said bias voltage to said third grid; and
wherein said color cathode-ray tube includes a second grid for controlling at least the electron beam spot diameter on said screen and/or the brightness of display on said screen, said bias voltage source includes means for supplying a suitable bias voltage to said second grid, and said grid modulation means includes means for voltage-dividing the output supplied to said third grid and supplying a resultant voltage division to said second grid.

9. The circuit according to claim 8, wherein said color cathode-ray tube includes a first grid for controlling at least the brightness of display on said screen, said bias voltage source includes means for supplying a bias voltage suited for said first grid, and said grid modulation means includes first means for extracting a sum component of said horizontal and vertical parabolic waveform voltages to obtain in-phase and opposite phase components of said extracted sum component and second means for mixing said in-phase and opposite-phase components obtained from said first means and supplying the resultant to said first grid.

10. A color CRT displaying correction circuit comprising:
a color cathode-ray tube including a screen to effect display by being illuminated by electron beams and at least one grid for controlling a character of the display on the screen;
a horizontal deflection coil provided on said color cathode-ray tube at a predetermined position thereof for horizontal deflection of said electron beams;
a vertical deflection coil provided on said color cathode-ray tube at a predetermined position thereof for vertical deflection of said electron beams;
a bias voltage source for supplying bias voltages to grids of said color cathode-ray tube;
horizontal deflection circuit means for supplying a horizontal deflection current to said horizontal deflection coil;
vertical deflection circuit means for supplying a vertical deflection current to said vertical deflection coil;
horizontal parabolic waveform voltage generator means for generating a horizontal parabolic waveform voltage with the level thereof increasing for positions from the center to the edges of the screen of said color cathode-ray tube according to said horizontal deflection current supplied from said horizontal deflection circuit means to said horizontal deflection coil and in synchronism to said horizontal deflection;
vertical parabolic waveform voltage generator means for generating a vertical parabolic waveform voltage with the level thereof increasing for positions from the center to the edges of the screen of said color cathode-ray tube according to said horizontal deflection current supplied from said vertical deflection circuit means to said vertical deflection coil and in synchronism to said vertical deflection;
grid modulation means for supplying said horizontal parabolic waveform voltage generated by said horizontal parabolic waveform generator means and said vertical parabolic waveform voltage generated by said vertical parabolic waveform voltage generator means in superimposition on said bias voltage from said bias voltage source to a grid of said color cathode-ray tube;
wherein said color cathode-ray tube includes at least a third grid for at least controlling the electron beam focusing with respect to said screen, said bias voltage source supplies a bias voltage suited to said first grid, and said grid modulation means supplies an output obtained as a result of superimposition of said horizontal and vertical parabolic waveform voltages on said bias voltage to said third grid; and
wherein said color cathode-ray tube includes a first grid for controlling at least the brightness of display on said screen, said bias voltage source includes means for supplying a bias voltage suited for said first grid, and said grid modulation means includes first means for extracting a sum component of said horizontal and vertical parabolic waveform voltages to obtain in-phase and opposite phase components of said extracted sum component and second means for mixing said in-phase and opposite-phase components obtained from said first means and supplying the resultant to said first grid.

11. A color CRT displaying correction circuit comprising:
a color cathode-ray tube including a screen to effect display by being illuminated by electron beams and at least one grid for controlling a character of the display on the screen;
a horizontal deflection coil provided on said color cathode-ray tube at a predetermined position thereof for horizontal deflection of said electron beams;
a vertical deflection coil provided on said color cathode-ray tube at a predetermined position thereof for vertical deflection of said electron beams;
a bias voltage source for supplying bias voltages to grids of said color cathode-ray tube;
horizontal deflection circuit means for supplying a horizontal deflection current to said horizontal deflection coil;
vertical deflection circuit means for supplying a vertical deflection current to said vertical deflection coil;
horizontal parabolic waveform voltage generator means for generating a horizontal parabolic waveform voltage with the level thereof increasing for positions from the center to the edges of the screen of said color cathode-ray tube according to said horizontal deflection current supplied from said horizontal deflection circuit means to said horizontal deflection coil and in synchronism to said horizontal deflection;
vertical parabolic waveform voltage generator means for generating a vertical parabolic waveform voltage with the level thereof increasing for positions from the center to the edges of the screen of said color cathode-ray tube according to said horizontal deflection current supplied from said vertical deflection circuit means to said vertical deflection coil and in synchronism to said vertical deflection;

grid modulation means for supplying said horizontal parabolic waveform voltage generated by said horizontal parabolic waveform generator means and said vertical parabolic waveform voltage generated by said vertical parabolic waveform voltage generator means in superimposition on said bias voltage from said bias voltage source to a grid of said color cathode-ray tube;

first and second control means for independently correcting the image quality irregularities in the center, portions in the vertical directions and portions in the horizontal directions of the screen; and wherein said color cathode-ray tube includes at least a third grid for at least controlling the electron beam focusing with respect to said screen, said bias voltage source supplies a bias voltage suited to said first grid, and said grid modulation means supplies an output obtained as a result of superimposition of said horizontal and vertical parabolic waveform voltages on said bias voltage to said third grid.

* * * * *

UNITED STATES PATENT AND TRADEMARK OFFICE
CERTIFICATE OF CORRECTION

Page 1 of 2

PATENT NO. : 4,916,365
DATED : April 10, 1990
INVENTOR(S) : C. ARAI

It is certified that error appears in the above-identified patent and that said Letters Patent is hereby corrected as shown below:

Title page, item (56):

Under "U.S. PATENT DOCUMENTS" -

--3,980,405  9/1976  Tatsuno et al--

Under "FOREIGN PATENT DOCUMENTS" -

--63-208371  2/1987  Japan--

--50-110732  9/1975  Japan--

--61-166668  10/1986  Japan--

--62- 89878  6/1987  Japan--

--62-  1468  1/1987  Japan--

--DT-2443515  9/1975  Germany--

UNITED STATES PATENT AND TRADEMARK OFFICE
CERTIFICATE OF CORRECTION

PATENT NO. : 4,916,365

DATED : April 10, 1990

INVENTOR(S) : C. ARAI

It is certified that error appears in the above-identified patent and that said Letters Patent is hereby corrected as shown below:

Title page:

Under "OTHER DOCUMENTS" -

--National Technical Report, Vol.33, No.2, April 1987 "High-Quality, High-Resolution 20-Inch CRT Display Monitor"--

--TDA8145 - advance data "TV East/West Correction Circuit for Square Tubes"; TV & Monitor Products; May 1986; published by SGS, Italy--

--TDA4950 - advance data "TV East/West Correction Circuit"; TV & Monitor Products; May, 1986; published by SGS, Italy--

Signed and Sealed this

Fourth Day of August, 1992

*Attest:*

DOUGLAS B. COMER

*Attesting Officer*     *Acting Commissioner of Patents and Trademarks*